US005460790A

United States Patent [19]
Shustorovich et al.

[11] Patent Number: 5,460,790
[45] Date of Patent: Oct. 24, 1995

[54] CATALYTIC VESSEL FOR RECEIVING METAL CATALYSTS BY DEPOSITION FROM THE GAS PHASE

[75] Inventors: Alexander Shustorovich; Eugene Shustorovich, both of Pittsford, N.Y.; Richard Montano, Vienna, Va.; Konstantin Solntsev, Moscow, Russian Federation; Yuri Buslaev, Moscow, Russian Federation; Veniamin Kalner, Moscow, Russian Federation; Nikolai Moiseev, Moscow, Russian Federation; Aleksandr Bragin, Moscow, Russian Federation

[73] Assignee: Blue Planet Technologies Co., L.P., New York, N.Y.

[21] Appl. No.: 38,435

[22] Filed: Mar. 29, 1993

Related U.S. Application Data

[63] Continuation-in-part of Ser. No. 840,860, Feb. 25, 1992, Pat. No. 5,322,671.

[51] Int. Cl.$^6$ ............................. B01D 53/34; B01D 53/94
[52] U.S. Cl. ............................ 422/177; 29/890; 55/524; 60/295; 422/172; 422/176; 422/182; 422/211; 502/527
[58] Field of Search ........................... 422/180, 172, 422/176, 182, 222, 177, 211; 55/523–528; 29/890; 60/295, 273, 282, 299; 502/527

[56] References Cited

U.S. PATENT DOCUMENTS

| | | |
|---|---|---|
| 1,989,113 | 1/1935 | Rector . |
| 2,086,775 | 7/1937 | Lyons et al. . |
| 2,151,432 | 3/1939 | Lyons et al. . |
| 2,194,186 | 3/1940 | Pier et al. . |
| 2,712,351 | 7/1955 | Roth et al. . |
| 2,800,172 | 7/1957 | Romer et al. . |
| 2,946,325 | 7/1960 | Gentile . |
| 3,211,534 | 10/1965 | Ridgway . |
| 3,348,932 | 10/1967 | Kukin . |
| 3,370,419 | 2/1968 | Kewtzer . |
| 3,450,116 | 6/1969 | Knight et al. . |
| 3,537,434 | 11/1970 | Herpin . |
| 3,716,040 | 2/1973 | Herpin ............................. 123/198 A |
| 3,746,498 | 7/1973 | Stengel . |
| 3,773,894 | 11/1973 | Bernstein et al. . |
| 3,800,532 | 4/1974 | Schischkow . |
| 3,856,901 | 12/1974 | Neumann et al. ..................... 261/18 A |
| 3,862,819 | 1/1975 | Wentworth, Jr. . |
| 3,875,922 | 4/1975 | Kirmss ............................. 123/198 A |
| 3,910,850 | 10/1975 | Turner ............................. 252/455 R |
| 3,929,118 | 12/1975 | Leong . |
| 3,953,369 | 4/1976 | Ohara et al. . |
| 3,959,183 | 5/1976 | Gospodar ......................... 252/477 R |
| 3,978,193 | 8/1976 | Fedor et al. ........................ 423/213.7 |
| 3,979,185 | 9/1976 | Stevenson ......................... 23/288 FB |
| 4,016,837 | 4/1977 | Wentworth, Jr. ..................... 123/25 R |
| 4,024,079 | 5/1977 | Okuyama et al. ................... 252/455 R |
| 4,048,098 | 9/1977 | Koberstein et al. ..................... 252/432 |

(List continued on next page.)

FOREIGN PATENT DOCUMENTS 942055 11/1963 United Kingdom .

*Primary Examiner*—Robert J. Warden
*Assistant Examiner*—Krisanne M. Thornton
*Attorney, Agent, or Firm*—Kenyon & Kenyon

[57] ABSTRACT

A catalytic vessel for adsorbing catalytic metals, such as from automotive exhaust gases, and carrying out three-way catalysis includes an inlet at an upstream end, a plurality of catalytic chambers located downstream of the inlet, and an outlet. At least one of the catalytic chambers contains a plurality of sheet members preferably made of steel and adapted for deposition of a metal selected from the group of noble and non-noble metals, and more particularly from the group including platinum, rhodium, rhenium, palladium, and gold. The vessel may be used in a catalytic system which contains a liquid source of metal catalysts, such as a solution or a gasoline additive, from which the metal catalysts are added to a combustion system, and the catalytic vessel, which collects the metal catalysts and is a site for three-way catalytic conversion of starting materials such as automotive emissions to final products.

22 Claims, 3 Drawing Sheets

U.S. PATENT DOCUMENTS

| | | | |
|---|---|---|---|
| 4,064,037 | 12/1977 | Graven et al. | 208/120 |
| 4,064,039 | 12/1977 | Penick | 208/160 |
| 4,090,838 | 5/1978 | Schena et al. | |
| 4,118,199 | 10/1978 | Völker et al. | 422/171 |
| 4,118,339 | 10/1978 | Latos | 252/417 |
| 4,170,960 | 10/1979 | Germack et al. | 123/198 A |
| 4,179,412 | 12/1979 | Inaba et al. | 252/472 |
| 4,188,309 | 2/1980 | Völker et al. | 252/466 J |
| 4,197,272 | 4/1980 | Tighe | 422/180 |
| 4,203,895 | 5/1980 | Parcell et al. | 260/239 E |
| 4,214,615 | 7/1980 | Boyer | 141/363 |
| 4,218,422 | 8/1980 | Schock et al. | 422/171 |
| 4,255,173 | 3/1981 | Mayer et al. | |
| 4,276,152 | 6/1981 | McHale et al. | 208/139 |
| 4,295,816 | 10/1981 | Robinson | |
| 4,317,918 | 3/1982 | Takano et al. | 562/406 |
| 4,362,130 | 12/1982 | Robinson | 123/1 A |
| 4,382,017 | 5/1983 | Robinson et al. | 252/429 R |
| 4,397,772 | 8/1983 | Noakes et al. | 252/477 R |
| 4,410,467 | 10/1983 | Wentworth | |
| 4,419,967 | 12/1983 | Protacio et al. | 123/1 A |
| 4,425,305 | 1/1984 | Kawata et al. | 422/171 |
| 4,475,483 | 10/1984 | Robinson | |
| 4,476,339 | 10/1984 | Reinhard et al. | 585/379 |
| 4,542,226 | 9/1985 | Eddy et al. | 549/214 |
| 4,631,076 | 12/1986 | Kurihara et al. | 55/283 |
| 4,646,516 | 3/1987 | Bostock | 60/295 |
| 4,665,051 | 5/1987 | Nonnemann | 502/439 |
| 4,665,690 | 5/1987 | Nomoto et al. | 60/286 |
| 4,752,302 | 6/1988 | Bowers et al. | 44/68 |
| 4,757,045 | 7/1988 | Turner et al. | 502/252 |
| 4,810,588 | 3/1989 | Bullock et al. | 428/603 |
| 4,842,617 | 6/1989 | Kukin | |
| 4,845,073 | 7/1989 | Cyron | 502/527 X |
| 4,863,889 | 9/1989 | Passaretti-Miscia | 502/216 |
| 4,868,148 | 9/1989 | Henk et al. | 502/303 |
| 4,891,050 | 1/1990 | Bowers et al. | |
| 4,892,562 | 1/1990 | Bowers et al. | |
| 4,919,903 | 4/1990 | Gandhi et al. | 423/213.5 |
| 4,939,113 | 7/1990 | Tauster et al. | 502/251 |
| 5,016,438 | 5/1991 | Harris | 422/176 X |
| 5,073,532 | 12/1991 | Domesle et al. | 502/304 |
| 5,094,821 | 3/1992 | Hitachi et al. | 422/180 |
| 5,140,810 | 8/1992 | Kuroda | |
| 5,177,960 | 1/1993 | Hitachi et al. | 502/527 X |

4,460,790

CATALYTIC VESSEL FOR RECEIVING METAL CATALYSTS BY DEPOSITION FROM THE GAS PHASE

CROSS-REFERENCE TO RELATED APPLICATIONS

This application is a continuation-in-part of U.S. application Ser. No. 07/840,860, filed Feb. 25, 1992, now U.S. Pat. No. 5,322,671.

FIELD OF THE INVENTION

This invention relates to catalytic vessels, more particularly to vessels for receiving metal catalysts by deposition from the gas phase for converting automotive emissions.

BACKGROUND OF THE INVENTION

There has long been a need to employ catalysts in the process of fuel combustion leading to simultaneous oxidation of carbon monoxide (CO) and unburned hydrocarbons, and the reduction of nitrogen oxides (NOx) (three-way catalysis) which are emitted from automotive engines and the like. The role of catalysts, particularly three-way catalysts, in automotive emission control has been widely studied in the art. For example, Taylor, "Automobile Catalytic Converter", *Catalysis, Science and Technology*, pp 119–67 (Anderson et al. eds. 1984), describes emissions control technology, composition of three-way catalysts, and catalytic supports.

Conventional systems for converting automotive exhaust gases employ pre-fabricated supported catalysts, typically a solid stratum of catalytic material, supported on ceramic or metallic substrates, which are placed in the exhaust section of the automobile. In prior art catalytic converter vessels, the substrate, ceramic or metallic, is pre-fabricated with a washcoat layer of catalyst, which layer then is the site for catalytic conversion. As the emissions pass through the solid, the catalytic metal present on the strata aids in conversion of CO, NOx and unburned hydrocarbons to $CO_2$, $N_2$ and $H_2O$. However, the solid strata-type catalytic converter eventually becomes spent, and requires removal and replacement in the exhaust portion of the engine. State of the art systems capable of carrying out three-way catalysis include those having supported rhodium and platinum, with noble metals such as rhodium being a preferred catalyst for the reaction:

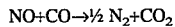

$$NO + CO \rightarrow \tfrac{1}{2} N_2 + CO_2$$

Platinum is the preferred catalyst for the oxidation of CO and unburned hydrocarbons.

The noble metals are expensive and in limited supply, particularly rhodium. This is exacerbated by the fact that current usage of rhodium in three-way catalysis exceeds the Rh/Pt mine ratio. Thus, reduction of noble metal usage is a problem of three-way catalysis. Therefore, it is necessary to develop alternative approaches to emission control.

Accordingly, there is a need for alternative catalytic vessels capable of converting automotive emissions not utilizing conventional additional, pre-fabricated, washcoated catalytic converters in the exhaust system of an automobile. There is likewise a need for alternative catalytic vessels containing metal catalysts which convert emissions with increased efficiency in order to decrease the required supply of catalyst.

OBJECTS AND SUMMARY OF THE INVENTION

In light of the foregoing, it is an object of the invention to provide a catalytic vessel capable of efficiently converting emissions from automotive engines, and in particular capable of efficiently carrying out three-way catalysis.

It is a further object of the invention to provide a catalytic vessel capable of converting automotive emissions without the need for an additional, pre-fabricated, washcoated catalytic converter in the exhaust portion of an engine.

It is a further object of the present invention to provide a catalytic vessel having a metallic substrate which, without a special washcoat, can effectively adsorb catalytic metals from solutions and from the gas phase for three-way catalytic conversion of emissions from a combustion chamber.

These and other objects of the invention are accomplished by a catalytic vessel comprising an inlet at an upstream end, a plurality of catalytic chambers located downstream of the inlet, wherein at least one of the chambers contains a plurality of sheet members, preferably made of steel, adapted for deposition of one or more metals selected from the group of noble and non-noble metals, and more particularly from the group consisting of platinum, rhodium, rhenium, palladium, and gold, and an outlet.

DETAILED DESCRIPTION OF THE PREFERRED EMBODIMENTS

Figure 1:
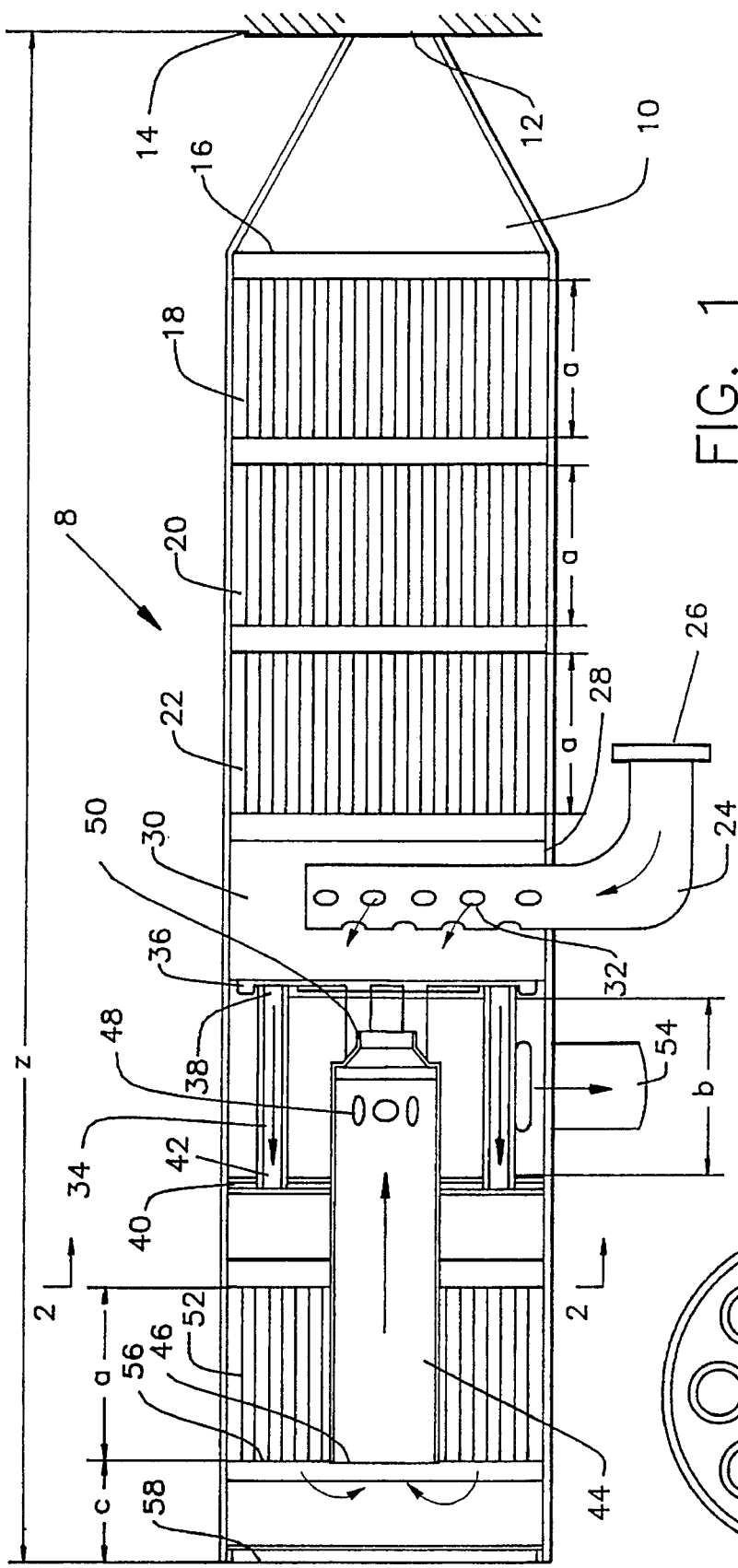
FIG. 1 is a cross-sectional side view of a catalytic vessel of the present invention.

The catalytic vessel of the present invention comprises an inlet at an upstream end, a plurality of catalytic chambers located downstream of the inlet, wherein at least one of the chambers contains a plurality of sheet members preferably made of steel and adapted for deposition of one or more metals selected from the group of noble and non-noble metals, and more particularly from the group consisting of platinum, rhodium, rhenium, palladium, and gold, and an outlet. The vessel is useful in a catalytic system which contains a liquid source of metal catalysts, as a solution or as a fuel additive, means for adding metal catalysts directly to a combustion system, and the catalytic vessel, which collects the metal catalysts, preferably from the gas phase (such as exhaust gases) and is a site for conversion of starting materials such as automotive emissions to final products.

The catalytic vessel is located downstream of the combustion chamber. The vessel receives the catalyst and serves as a reaction site for the extremely efficient conversion of automotive emissions to $CO_2$, $N_2$, and $H_2O$. The catalytic vessel is structured such that it contains sufficient exposed surface capable of retaining the catalyst and making the catalyst sufficiently available for reaction with automotive emissions which flow through the vessel.

Vessels of the invention include an outer shell and an inner working body, which serves as a site of catalyst metal collection and catalytic conversion. Materials used in the construction of the working body of the catalytic vessel can be any thermostable material, metallic or ceramic, capable after treatment of adsorbing catalytic metals from a source such as a solution or the gas phase, particularly exhaust gases. The preferred materials are steels and other iron-based alloys.

In a particularly preferred embodiment of the invention, the working body of the vessel is made using low carbon steel. Preferably, the steel is treated prior to the assembly of the catalytic vessel. Low carbon steel refers to steel having a carbon content less than about 0.5 percent by weight.

In particular, the low carbon steel may be treated by a process preferably including (a) washing the steel, most preferably with a hot solution of NaOH or KOH, preferably a 50 to 60% solution, for 30 to 40 minutes, (b) washing with distilled water, (c) treating by exposure to a weak HCl solution, preferably a 12 to 15% solution, for 20 to 30 minutes, (d) washing again with distilled water, and (e) heating for about 2.5 to 3 hours at temperatures up to about 400° C. Such treatment will generally impart a distinct orange or rust color to the steel surface ($Fe_xO_y$). Preferably, the second distilled water wash, and subsequent heating are repeated up to three times to create a visibly loose, bright orange layer on the steel surface.

Further pre-treatment preferably involves impregnating the surface with catalyst metals to enhance initial vessel performance. Preferably, the additional pre-treatment includes exposing the steel to, most preferably by submerging the steel in, a catalytic solution, most preferably for 1 to 2 minutes. The solution preferably contains about 0.2 to about 0.25 g/l Pt, about 0.05 to about 0.1 g/l Rh, and about 0.3 to about 0.7 g/l Re. In the most preferred embodiment, the metals are present in the solution as $H_2PtCl_6$, $RhCl_3$, and $NH_4ReO_4$. After this soaking step, the steel preferably is calcined, most preferably at a temperature of 650° C. for 30 to 40 minutes in a furnace having an initial temperature of between 70° C. and 100° C., and then cooled, most preferably with a jet of cold air. The impregnation and calcination steps preferably are repeated 2 to 3 times.

The catalytic solution to which the steel is exposed is a solution preferably containing several of the following: $H_2PtCl_6$, $RhCl_3.4H_2O$, $Re_2O_7$, and $NH_4ReO_4$. In particular, four solutions have been found to be most effective. In the first solution, 1.3261 grams of $H_2PtCl_6$ dissolved in 30 ml of $H_2O$ is thoroughly mixed with 0.3350 grams of $RhCl_3.4H_2O$ dissolved in 20 ml of $H_2O$ and 0.9078 grams of $Re_2O_7$ dissolved in 30 ml of $H_2O$, along with 1 ml of acetic acid ($CH_3COOH$). This solution is preferably diluted by adding a 1:1 ratio of distilled water.

The method of preparation of the second, third and fourth solutions are similar to that of the first solution, including dilution with distilled water. However, in the second solution, the amount of $RhCl_3.4H_2O$ is approximately doubled. In the third and fourth solutions, the amount of $RhCl_3.4H_2O$ is approximately the same as for the second solution, and the $Re_2O_7$ is replaced with approximately 1.9805 grams of $NH_4ReO_4$. The third solution differs from the fourth solution in that the third solution does not contain acetic acid.

In another embodiment of the invention, the working body of the vessel includes materials made from stainless steels, and for example the steel having about 23 weight percent Cr, 5 percent Al, $\geq 0.1$ percent C, $\geq 0.5$ percent Mn, $\geq 0.5$ percent Si, $\geq 0.25$ percent P, and traces of S and Ti. Other exemplary stainless steels include those bearing ASME designations 409L and 410L. Where stainless steels are employed in vessels of the invention, it is preferred that in order to create an oxidized surface ($Fe_xO_y$) suitable for adsorbing catalyst metals from the gas phase, that the steel be exposed to hot concentrated $H_2SO_4$, preferably about a 90% solution. It is believed that this treatment removes a portion of the Cr on the surface. Preferably, the material is then washed with distilled water, and dried in a flow of $H_2O_2$ for about 2 to 3 hours. Typically, such a treatment will result in formation of a distinct orange or rust layer on the surface indicative of oxidation of the stainless steel surface.

Preferably, the vessel is a muffler or muffler-like system having a series of catalytic chambers, each of which contains multiple rows of sheet members extending across the catalytic chamber. The pre-treated surfaces of the sheet members allow the metal catalyst from the catalytic solution and exhaust gases to be sufficiently retained in the vessel to convert emissions passing through the vessel.

In particular, emissions passing through the vessel from the combustion chamber contact the catalyst and are converted to $N_2$, $CO_2$ and $H_2O$. CO and unburned hydrocarbons are oxidized, and NOx is reduced on the metal sites. After conversion, the products are desorbed, making the site available for further conversion. The catalysis reactions in the vessel preferably are a three-way catalysis: oxidizing CO, oxidizing unburned hydrocarbons, and reducing NOx.

Catalytic vessels of the invention exhibit the unique ability to adsorb catalyst metals from the gas phase for three-way catalysis of emissions from combustion chambers. A significant aspect of this feature of the invention is the creation of a developed surface of the working body of the vessel which is adapted for deposition of metals from a gas phase source, containing catalytic metals from fuel additives or liquid catalyst solutions. The developed surface is a site for catalytic metal adsorption and for catalytic conversion. Preferred surfaces include oxidized surfaces of metallic substrates such as steel substrates. In contrast to prior art catalytic converters, where catalytic sites are contained within a washcoat, in the present invention the substrate itself preferably is a primary site for catalytic conversion.

With prior art pre-fabricated catalytic converters, as the layer of catalytic metals becomes poisoned over time, the converter can become less efficient, and eventually require replacement. With vessels of the present invention, since the substrate is adapted to receive the catalytic metal by gas phase deposition from exhaust gases, catalytic metals can be provided to the vessel over time to maintain the conversion efficiency at desired levels and to avoid premature poisoning of the vessel.

Referring to FIG. 1, there is shown a catalytic vessel 8 of the present invention. The vessel 8 contains an inlet conduit 10, which preferably is connected at its upstream end 12 to a combustion system of an automotive engine, via a flange 14. Conduit 10 is connected at its downstream end 16 to the first 18 of three distinct catalytic chambers 18, 20, 22.

Optionally, a secondary inlet line 24 is connected at its upstream end 26 to the combustion system of the automotive engine in order to receive a secondary source of exhaust gas.

The secondary inlet line 24 extends through, and is connected to, the body 28 of the catalytic vessel 8 in order to deliver the secondary source of exhaust gas to a central portion 30 of the vessel 8, preferably through a plurality of holes 32 in the secondary inlet line 24.

Figure 2:
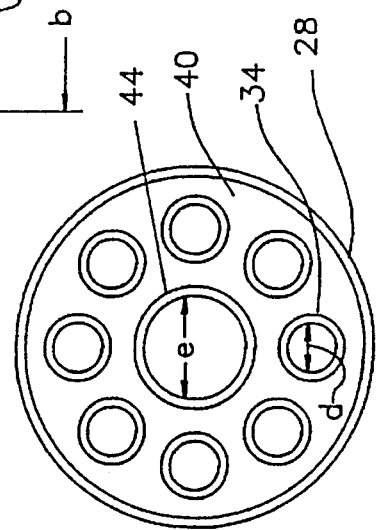
FIG. 2 is a cross-sectional rear view of the catalytic vessel shown in FIG. 1.

A plurality of outside tubes 34 are connected, preferably welded, at their upstream ends 38 to a first partition 36, located downstream from the central portion 30. Tubes 34 are also connected, preferably welded, at their downstream ends 42 to a second partition 40, located further downstream from the central portion 30. The number and positioning of the outside tubes 34 can vary, but preferably there are eight outside tubes 34 arranged in a circular formation around a central tube 44, as shown in FIG. 2 (a cross-sectional rear view taken along line 2—2 of FIG. 1), such that each of the outside tubes 34 is parallel to the central tube 44, along the length from first partition 36 to second partition 40.

Referring again to FIG. 1, the central tube 44 is connected, preferably welded, to the second partition 40. The central tube 44 creates an exhaust gas passage from one (open) end 46 to at least a portion of the tube located between the first and second partitions 36, 40 that has a plurality of distinct holes 48, preferably arranged a fixed distance apart from one another around the circumference of the central tube 44. The other end 50 of the central tube 44 is sealed.

Therefore, the first partition 36 completely divides the catalytic vessel 8, except for the outside tubes 34. The second partition 40 completely further divides the catalytic vessel 8, except for the outside tubes 34 and the central tube 44.

A fourth catalytic chamber 52 is located downstream from the second partition 40. While the catalytic vessel 8 preferably contains four catalytic chambers 18, 20, 22, 52, the number of catalytic chambers can vary.

An exit conduit 54 extends radially from the portion of the catalytic vessel 8 between the first and second partitions 36, 40. The exit conduit 54 leads to the egress of the system, such as to the atmosphere.

In an exemplary embodiment of the invention, the catalytic vessel 8 has the following dimensions: the total length z of the catalytic vessel 8 is 585 mm; the distance a between the upstream and downstream ends of each of the catalytic chambers 18, 20, 22, 52 is 55 mm; the distance b between the first and second partitions 36, 40 is 80 mm; the distance c between a downstream end 56 of the fourth catalytic chamber 52 and a downstream end 58 of the catalytic vessel 8 is 46 mm; the internal diameter d of each of the outside tubes 34 is 16 mm; and the internal diameter e of the central tube 44 is 40 mm.

Figure 3:
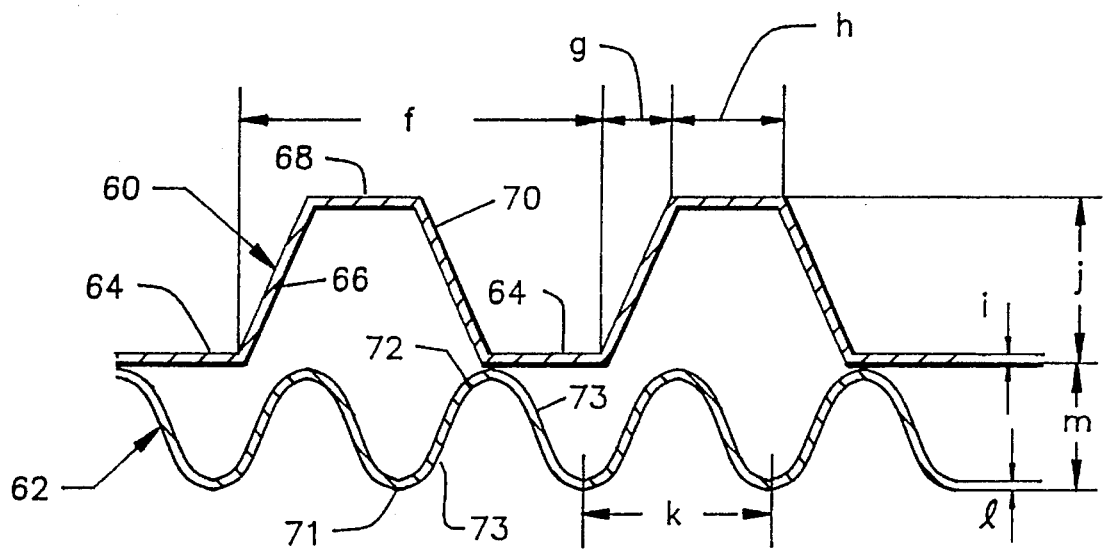
FIG. 3 is a cross-sectional front view of a first embodiment of a sheet member formation contained in a catalytic chamber of a catalytic vessel of the present invention.
Figure 4:
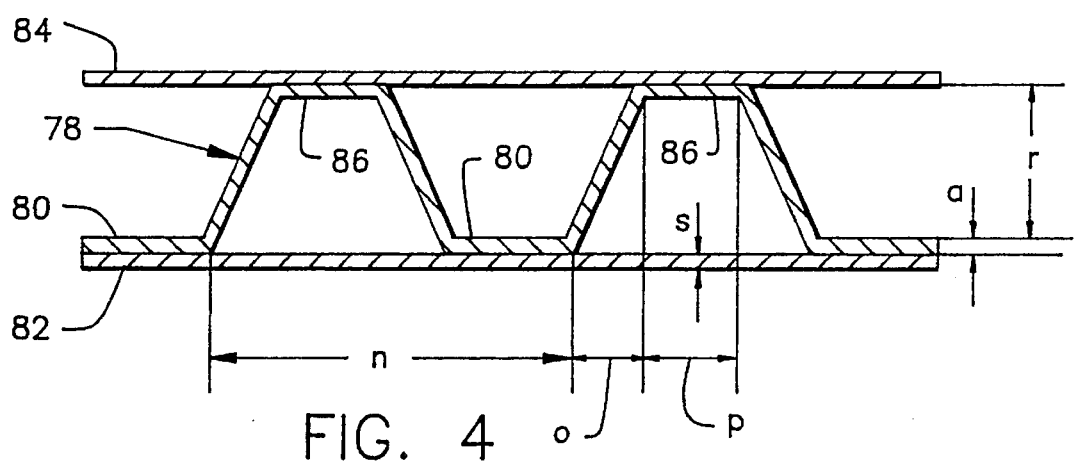
FIG. 4 is a cross-sectional front view of a second embodiment of a sheet member formation contained in a catalytic chamber of a catalytic vessel of the present invention.
Figure 5:
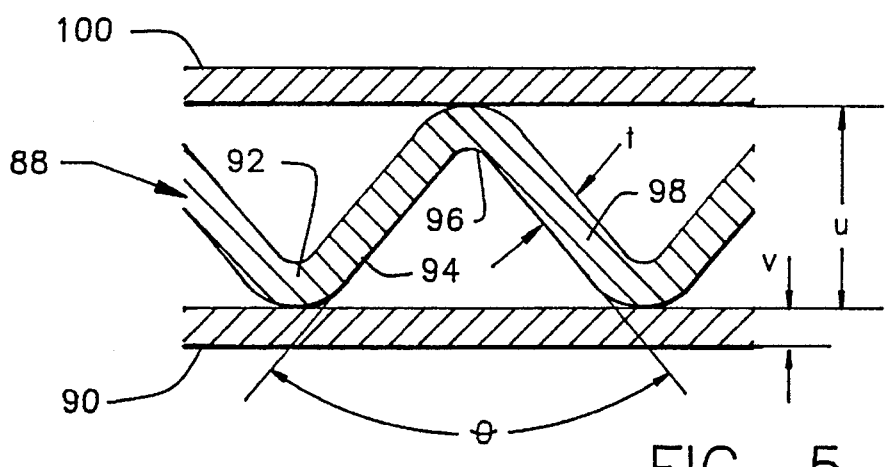
FIG. 5 is a cross-sectional front view of a third embodiment of a sheet member formation contained in a catalytic chamber of a catalytic vessel of the present invention.

FIGS. 3 through 5 show cross-sectional front views of three, preferably alternative, internal configurations of one or more, and preferably each, of the catalytic chambers 18, 20, 22, 52. The configuration shown in FIG. 3 is preferred in that it may operate at a higher level of effectiveness. In particular, this configuration may meet desired conversion levels more quickly during engine warm-up and, thus, would have better performance under cold starting conditions.

In FIG. 3, a first corrugated sheet member 60 is positioned above a second corrugated sheet member 62. The first corrugated sheet member 60 preferably includes a repeating four-submember configuration of a lower horizontal submember 64, coupled to a positive-sloping submember 66, in turn coupled to an upper horizontal submember 68, in turn coupled to a negative-sloping submember 70. The second corrugated sheet member 62 has an undulating shape with preferably curved lower portions 71 and upper portions 72 connected by substantially straight connecting portions 73. Each of the lower and upper curved portions 71, 72 is preferably an arc of a circle having a radius of about 0.2 mm. Each of the first and second corrugated sheet members 60, 62 preferably extends across the entire catalytic chamber.

Figure 6:
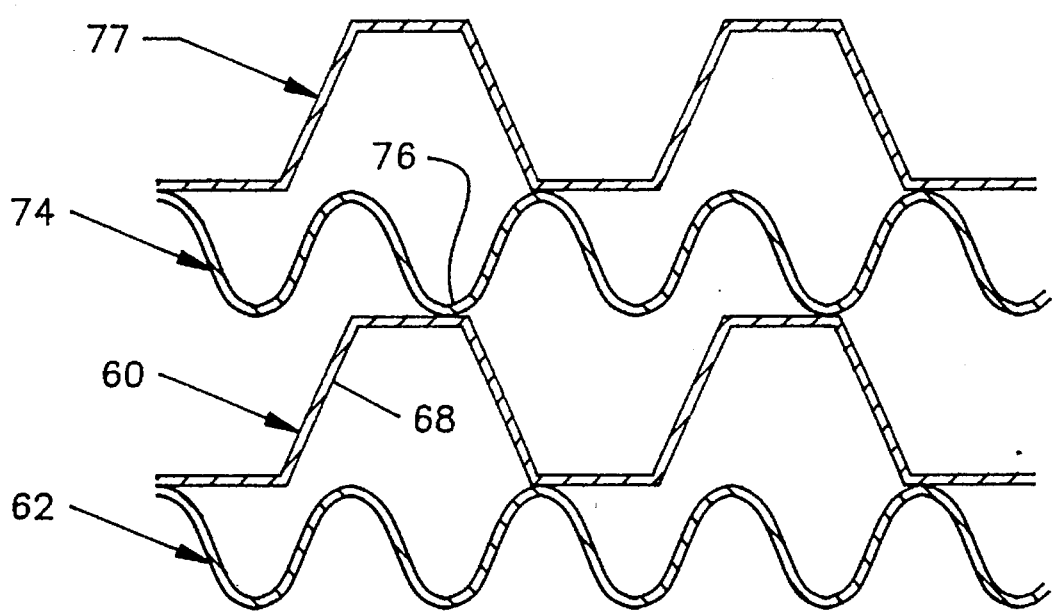
FIG. 6 is a cross-sectional front view of the first embodiment of the sheet member formation shown in FIG. 3, illustrating multiple first and second sheet members.

The first and second corrugated sheet members 60, 62 are connected such that each lower horizontal submember 64 of the first corrugated sheet member 60 is connected to the corresponding upper portion 72 of the second corrugated sheet member 62. Preferably identical first-second corrugated sheet member formations are connected above one another so as to span the entire height of the catalytic chamber. In particular, as shown in FIG. 6, an additional second corrugated sheet member 74 is connected above the first corrugated sheet member 60 such that each upper horizontal submember 68 of the first corrugated sheet member 60 is connected to a corresponding lower portion 76 of the additional second corrugated sheet member 74. An additional first corrugated sheet member 77 is connected above the additional second corrugated sheet member 74, and so forth.

In an exemplary embodiment of the configuration shown in FIG. 3, the first and second corrugated sheet members are dimensioned as follows:

$f = 4$ mm
$g = 0.7$ mm
$h = 1.3$ mm
$i = 0.1$ mm
$j = 1.75$ mm
$k = 2$ mm
$l = 0.05$ mm
$m = 1.1$ mm

FIG. 4 shows a second possible internal configuration of a catalytic chamber. In particular, a first corrugated sheet member 78, which is similar in shape to the first corrugated sheet member shown in FIG. 3, is connected, at each of its lower horizontal submembers 80, to a second horizontal sheet member 82.

Analogous to FIG. 3, each of the first and second sheet members 78, 82 shown in FIG. 4 preferably extends across the entire catalytic chamber. In addition, identical first-second sheet member formations are preferably connected above one another so as to span the entire height of the catalytic chamber. In particular, an additional second horizontal sheet member 84 is connected above the first corrugated sheet member 78 at each of the upper horizontal submembers 86 of the first corrugated sheet member 78, and so forth.

In an exemplary embodiment of the configuration shown in FIG. 4, the first and second sheet members are dimensioned as follows:

$n = 4$ mm
$o = 0.7$ mm
$p = 1.3$ mm
$q = 0.2$ mm
$r = 1.75$ mm
$s = 0.2$ mm

FIG. 5 shows a third possible internal configuration of a catalytic chamber. In particular, a first corrugated sheet member 88 is positioned above a second horizontal sheet member 90. The first corrugated sheet member 88 has an undulating shape, and preferably includes a lower curved portion 92, a positive-sloping portion 94, an upper curved portion 96, and a negative-sloping portion 98. The inner side of each of the lower and upper curved portions 92, 96 is preferably an arc of a circle having a radius of about 1.6 mm. The first corrugated sheet member 88 is connected, at each of its lower curved portions 92, to the second horizontal sheet member 90.

Analogous to FIGS. 3 and 4, each of the first and second sheet members 88, 90 shown in FIG. 5 preferably extends across the entire catalytic chamber. In addition, identical first-second sheet member formations are preferably connected above one another so as to span the entire height of the catalytic chamber. In particular, an additional second horizontal sheet member 100 is connected above the first corrugated sheet member 88 at each of the upper curved portions 96 of the first corrugated sheet member 88, and so forth.

In an exemplary embodiment of the configuration shown in FIG. 5, the first and second sheet members are configured as follows:

$$t = 0.8 \text{ mm}$$
$$u = 3 \text{ mm}$$
$$v = 0.8 \text{ mm}$$
$$\Theta = 90°$$

In operation, the vessel 8 serves as a catalytic collection and reaction site. U.S. application Ser. Nos. 07/841,356 and 07/841,357, each filed Feb. 25, 1992, and each of which is incorporated herein by reference, describe more fully catalyst solutions which can be the source for the metal catalyst, and catalytic systems which can incorporate the catalytic vessel of the present invention. It is preferred that the catalyst originate from a catalyst source containing one or more metal compounds, such as a liquid catalyst solution containing one or more metal compounds in a suitable solvent. A co-pending application filed herewith entitled Gasoline Additives for Catalytic Control of Emissions from Combustion Engines describes an additional useful system for providing catalyst metals to the vessel of the invention. The disclosure of this application is also hereby incorporated by reference. The catalyst sources as gasoline additives described in this latter application are preferred sources for the catalyst metal provided to the vessel of the invention.

Metals useful in the present invention include non-noble metals, and more particularly rhenium, and noble metals, and more particularly platinum, rhodium, palladium and gold.

Where catalyst solutions are employed as a source of catalyst, the metals can be present in compound forms such as chlorides, carbonyls, perrhenates, and oxides in the solution. Preferred solvents for the metal compounds include glycol derivatives, and in particular diethylene glycol derivatives such as diglyme [$CH_3O(CH_2)_2O(CH_2)_2OCH_3$], triglyme and tetraglyme. Other preferred solvents include alkyl pyrrolidones such as N-methyl pyrrolidone and alkoxy ethyl ethers. Diglyme is a particularly preferred solvent. In the most preferred embodiment, the solution contains $H_2PtCl_6 \cdot 6H_2O$, $LiReO_4$ and $RhCl_3 \cdot 4H_2O$ in diglyme.

The solution can be introduced into a catalytic system, such as by pumping or atomization, which introduces small drops of solution. The metal catalyst in the solution is carried through the system, preferably by the air intake of the automotive engine through the combustion chamber to the inlet conduit 10.

Alternatively, and preferably, the catalyst metals can be dissolved into the gasoline in the combustion system, such as by forming catalyst metal-containing compounds into briquettes or by making a filter containing metal-containing compounds, which can be place directly into a gasoline reservoir for an engine, or which can be placed across a gasoline flow line.

After introduction into the combustion system, the metal catalyst is carried from the conduit 10 into the vessel 8, where it can be deposited, primarily, on the large number of surfaces of the sheet members contained in the catalytic chambers 18, 20, 22, 52. The metal catalyst can then serve as a reaction site for emissions from the combustion chamber which enter the vessel 8 through the inlet conduit 10, or through the secondary inlet line 24. The metal catalyst can be replenished over time, preferably from the gas phase using a system such as the one described in U.S. Ser. No. 841,357. The catalyst source can be a solution, such as those described in Ser. No. 841,356, or a slowly dissolving solid catalyst source which releases catalyst metals over time into the combustion system, such as is described in the copending application filed herewith, or other suitable catalyst source and delivery means.

While not wishing to be bound by theory, it is believed that the metal catalyst is adsorbed on the surfaces and is dispersed so that a sufficient amount of precious metal surface available for reaction is obtained. It is believed that more metal catalytic sites are available for reaction in the system of the invention than in conventional catalytic converters.

Once the catalyst is adsorbed on a surface of the working body in the vessel 8, it is believed that a conventional three-way catalysis of emissions occurs. That is, unburned hydrocarbons are oxidized, CO is oxidized, and NOx is reduced to $H_2O$, $CO_2$ and $N_2$. After oxidation and reduction are carried out, the $H_2O$, $CO_2$ and $N_2$ products are desorbed, and the site is available for further reaction. The catalyst present in the vessel 8 can be continuously or periodically replenished by addition of a fuel additive or additional catalytic feed solution into the system.

The path of emissions through the catalytic vessel 8 will now be described, with reference to the directional arrows of FIG. 1. Emissions from a combustion system of an automotive engine enter the vessel 8 at the inlet conduit 10. The emissions then pass through each of the first three catalytic chambers 18, 20, 22, and in particular between the sheet members contained, preferably, in each of these catalytic chambers 18, 20, 22. In the central portion 30, the emissions from the combustion system through the inlet conduit 10 preferably join with a secondary source of emissions fed from the combustion system through the holes 32 in the secondary inlet line 24.

The emissions then pass through the outside tubes 34, through the fourth catalytic chamber 52, and through, in the reverse direction, the passage in the central tube 44. The emissions leave the central tube 44 through the holes 48 and, thereafter, leave the vessel 8 through the exit conduit 54. It is believed that three-way catalysis occurs substantially throughout the vessel 8 from the inlet at conduit 12 to the outlet at conduit 54.

Use of a catalytic system of the present invention has been shown to permit operation of an automotive engine in a leaner regime, thereby increasing fuel economy. Conventional automotive engines adapted to convert emissions sufficiently to meet current United States pollutant level requirements of conversion of 76% NOx, 94% CO and 94% unburned hydrocarbons must operate at an air number of about 0.90 to 1.03 (with an air number of 1.0 equivalent to a stoichiometric air:fuel ratio of 14.7:1 by weight). With catalytic systems of the present invention, it may be possible to operate the engine at air numbers above 1.10 and still meet pollutant level requirements.

In addition, use of the catalytic vessel of the present invention as a muffler system has been shown to reduce pressure and, thus, noise better than many conventional muffler systems.

What is claimed is:

1. A catalytic vessel comprising:

an outer shell having an inlet positioned at an upstream end of the shell, and an outlet positioned at a downstream end of the shell; and a working body located in the shell, the working body comprising a steel selected from the group consisting of low carbon and stainless steel, wherein the steel has an oxidized surface constructed and arranged for adsorption of metal catalysts from a gas phase, such that the working body is constructed and arranged to serve as a site which is replenishable in situ for carrying out three-way catalysis.

2. A vessel according to claim 1, wherein the working body comprises a first corrugated sheet member at least one of said corrugated sheet members comprising the oxidized surface, connected to a second corrugated sheet member, wherein the first corrugated sheet member includes alternating positive and negative sloping submembers connected by alternating lower and upper planar submembers, and wherein the second corrugated sheet member includes alternating positive and negative sloping submembers connected by alternating lower and upper curved submembers.

3. The catalytic vessel according to claim 1 wherein the working body comprises a low carbon steel whose surface has been oxidized by (a) washing the steel with a hot solution including at least one of NaOH and KOH, (b) washing with distilled water, (c) exposing the surface to a weak HCl solution, (d) washing with distilled water, and (e) heating at temperatures up to about 400° C.

4. The catalytic vessel according to claim 3 wherein the heating is carried out for about three, 2.5 to 3 hour treatments.

5. The catalytic vessel according to claim 1 wherein the working body is a stainless steel which has been oxidized through exposure to concentrated $H_2SO_4$, washing with distilled water, and drying in a flow of $H_2O_2$.

6. The catalytic vessel according to claim 5 wherein the stainless steel has a composition selected from the group consisting of 409L and 410L stainless steels.

7. The catalytic vessel according to claim 5 wherein the surface of the stainless steel has been exposed to a catalytic solution containing one or more catalyst metals selected from the group consisting of Pt, Rh, Re, Pd, and Au; and calcined at a temperature of about 650° C.

8. The catalytic vessel according to claim 7 wherein the catalyst solution contains about 0.2 to about 0.25 g/l Pt, about 0.05 to about 0.1 g/l Rh, and about 0.3 to about 0.7 g/l Re.

9. The catalytic vessel according to claim 7 wherein the catalyst solution contains $H_2PtCl_6$, $RhCl_3$, and $NH_4ReO_4$.

10. The catalytic vessel according to claim 2, wherein the lower and upper planar submembers are parallel to one another.

11. The catalytic vessel according to claim 10, wherein the lower and upper planar submembers are horizontally oriented.

12. The catalytic vessel according to claim 2, wherein each of the first and second corrugated sheet members extends across the entire outer shell.

13. The catalytic vessel according to claim 2, wherein the working body includes a plurality of alternating first and second corrugated sheet members.

14. The catalytic vessel according to claim 13, wherein and each of the lower planar submembers of each of the first corrugated sheet members is connected to a corresponding upper curved submember of one of the second corrugated sheet members.

15. The catalytic vessel according to claim 13, wherein and each of the upper planar submembers of each of the first corrugated sheet members is connected to a corresponding lower curved submember of one of the second corrugated sheet members.

16. In a catalytic system including a metal catalyst source and a means for adding metal catalyst from the source to a combustion system, and wherein the improvement comprises a catalytic vessel for adsorbing catalyst metals by deposition from a gas phase including:

an outer shell having an inlet positioned at an upstream end of the shell, and an outlet positioned at a downstream end of the shell; and a working body located in the shell, the working body comprising a steel selected from the group consisting of low carbon and stainless steel, wherein the steel has an oxidized surface constructed and arranged for adsorption of metal catalysts from the gas phase, such that the working body is constructed and arranged to serve as a site which is replenishable in situ for carrying out three-way catalysis.

17. A vessel according to claim 16, wherein the working body comprises a plurality of corrugated sheet members, at least one of said corrugated sheet members comprising the oxidized surface.

18. The catalytic vessel according to claim 17, wherein at least one of the corrugated sheet members includes alternating positive and negative sloping submembers connected by alternating lower and upper planar submembers.

19. The catalytic vessel according to claim 18, further comprising a plurality of catalytic chambers located downstream of the inlet.

20. The catalytic vessel according to claim 16, further comprising a central tube in the working body extending in a direction parallel to a longitudinal axis of said outer shell, and a plurality of outside tubes arranged in the working body in a direction parallel to the central tube in a circular formation around the central tube.

21. The catalytic vessel according to claim 20, wherein the central tube has a plurality of holes arranged around the circumference of the central tube.

22. The catalytic vessel according to claim 17, further comprising a secondary inlet line extending through the outer shell of the catalytic vessel.

* * * * *